United States Patent [19]

Yamazaki et al.

[11] Patent Number: 5,440,353
[45] Date of Patent: Aug. 8, 1995

[54] DISPLAY MONITOR INCLUDING MOIRE CANCELLATION CIRCUIT

[75] Inventors: Masao Yamazaki, Fujisawa; Tsutomu Kitamura, Tokyo, both of Japan

[73] Assignee: Matsushita Electric Industrial Co., Ltd., Kodama, Japan

[21] Appl. No.: 22,038

[22] Filed: Feb. 24, 1993

[30] Foreign Application Priority Data

| Feb. 25, 1992 | [JP] | Japan | 4-037486 |
| Feb. 25, 1992 | [JP] | Japan | 4-037495 |
| Feb. 25, 1992 | [JP] | Japan | 4-037496 |
| Mar. 12, 1992 | [JP] | Japan | 4-053369 |

[51] Int. Cl.⁶ .......................................... H04N 17/04
[52] U.S. Cl. ..................... 348/806; 348/189; 315/382.1
[58] Field of Search .......... 348/806, 177, 189, 190, 348/524, 745–747; 315/382, 382.1; H04N 17/04

[56] References Cited

U.S. PATENT DOCUMENTS

| 4,499,457 | 2/1985 | Hintze | 315/382 |
| 4,990,832 | 2/1991 | Maninges | 315/382 |
| 5,107,188 | 4/1992 | Rindal | 348/524 X |
| 5,241,237 | 8/1993 | Misuno et al. | 315/382 |
| 5,298,985 | 3/1994 | Tsujihara et al. | 348/806 X |

FOREIGN PATENT DOCUMENTS 54-148423 11/1979 Japan .
63-275284 11/1988 Japan .

Primary Examiner—Victor R. Kostak
Attorney, Agent, or Firm—Cushman, Darby & Cushman

[57] ABSTRACT

Horizontal moire phenomenon is reduced by producing a control signal by a moire canceling circuit comprising a frequency divider (1,201,301,401) and a horizontal position shifting circuit (2, 202, 302, 402), and supplying the control signal to a deflection circuit block (3).

8 Claims, 14 Drawing Sheets

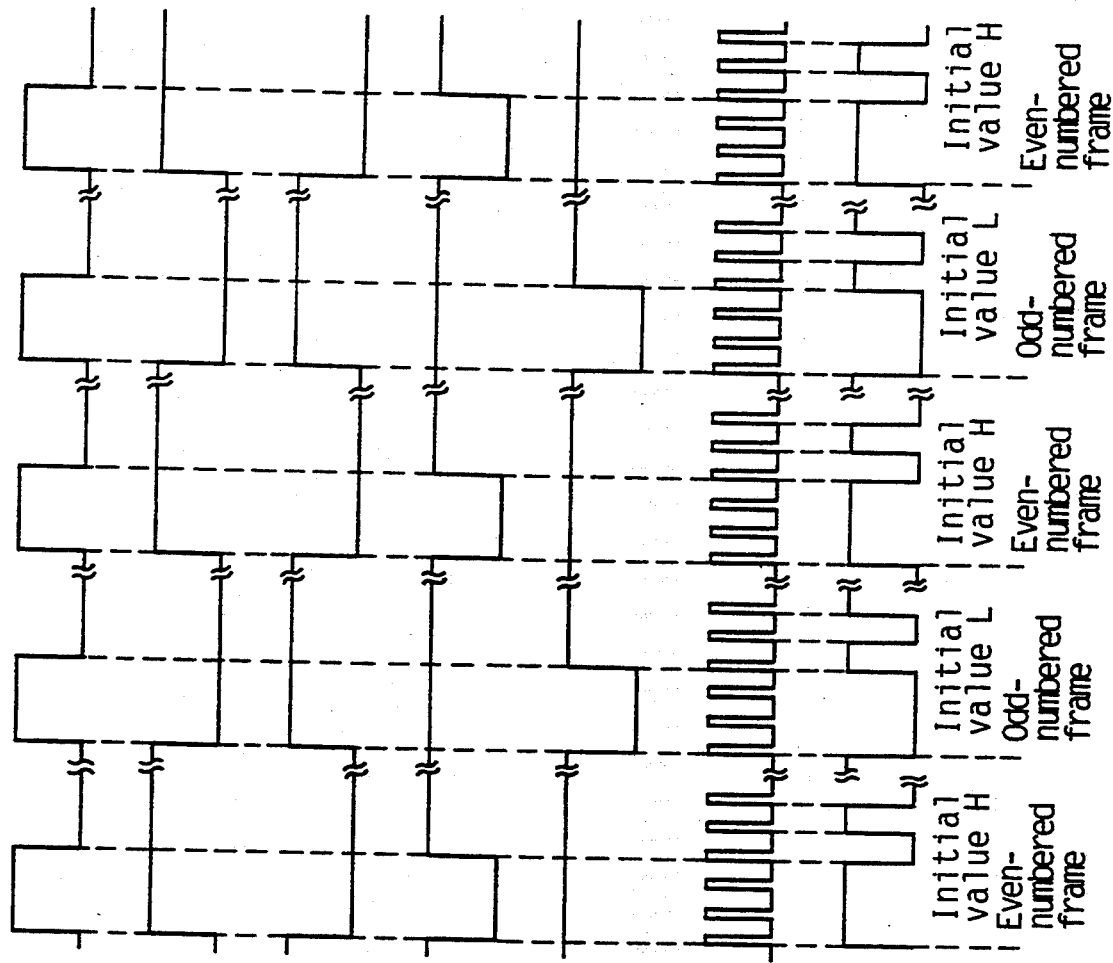

— Odd-numbered frame    - - - - - Even-numbered frame

First scanning line
Second scanning line
Third scanning line
Fourth scanning line
Fifth scanning line
Sixth scanning line
Seventh scanning line
Eighth scanning line
Nineth scanning line
Tenth scanning line

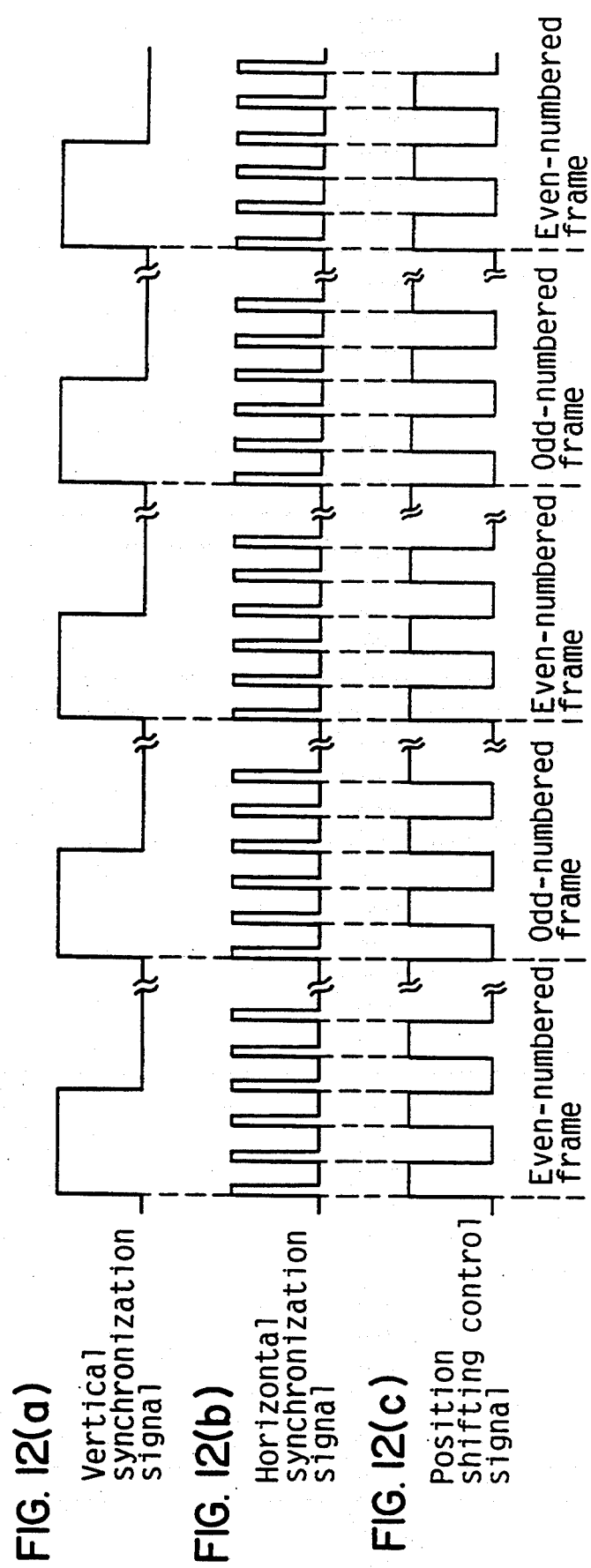

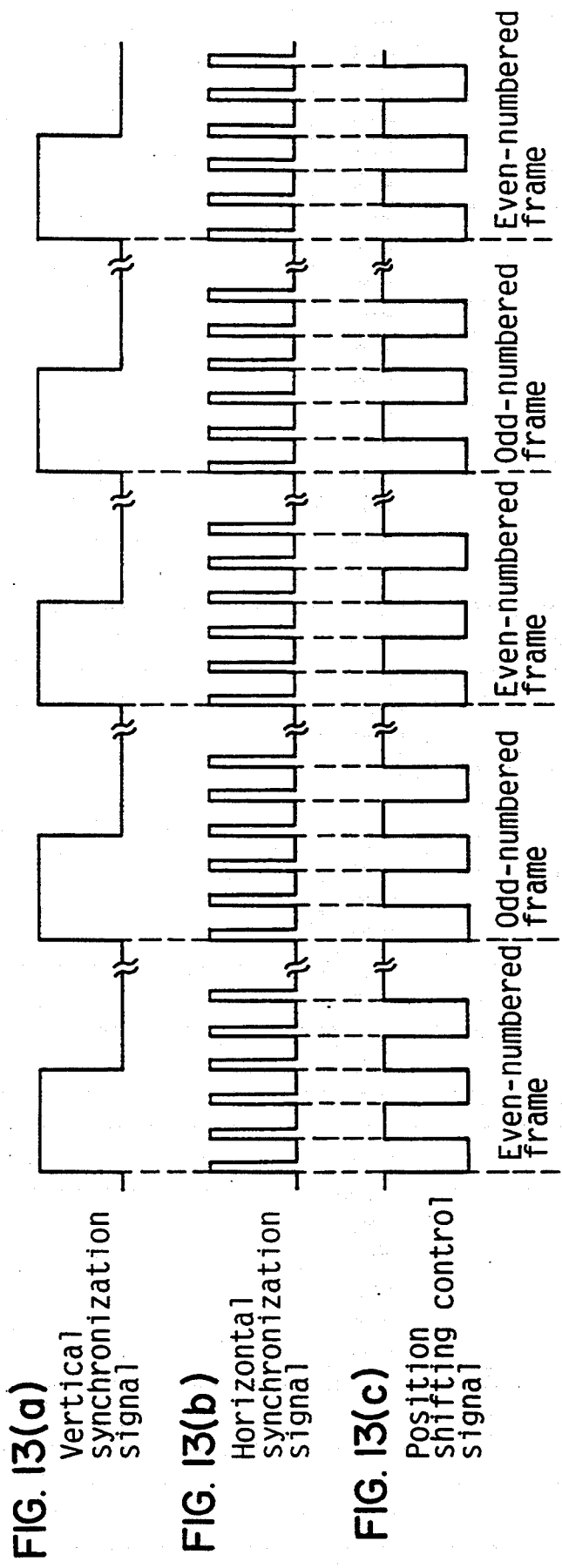

DISPLAY MONITOR INCLUDING MOIRE CANCELLATION CIRCUIT

FIELD OF THE INVENTION AND RELATED ART STATEMENT

1. Field of the Invention

The present invention generally relates to a raster-scanning type display monitor using a color cathode ray tube (CRT) as an output device, for instance, a video display terminal, of a computer or the like (throughout this description and claims, it is simply referred to as a "display monitor"). In particular, the present invention is concerned with a circuit for reducing the horizontal moire phenomenon on the displayed raster produced on a screen of such display monitor operating under both the interlacing system and the non-interlacing system.

2. Description of the Prior Art

A display monitor operating under the raster-scanning system repeats the horizontal scanning of an electron beam and displays a raster by vertically moving the resulting scanning lines. In a cathode ray tube, the dot pitch of the fluorescent material on the screen of the CRT that can emit a fluorescence is determined by the aperture pitch of the shadow mask. Thus, in case of displaying a pattern that repeats ON and OFF of a display for every dot in the horizontal direction, the pitch of the dots in the displayed pattern may sometimes interfere with the aperture pitch in the shadow mask, thereby causing a horizontal moire phenomenon. In order to reduce this horizontal moire phenomenon, there has hitherto been proposed a number of systems. Examples of include a combination of the following measures.

1. Reduction in the mutual interference between the pitch of the dots in the displayed image pattern and that of the apertures of the shadow mask by varying the size of the display region of the raster on the screen of the CRT thereby changing the pitch of the dots in the displayed pattern.
2. Reduction in the mutual interference between the pitch of the dots in the displayed pattern and that of the apertures of the shadow mask by changing the pitch of the apertures of the shadow mask.
3. Making the moire phenomenon less remarkable by deteriorating the focusing of the electron beam on the screen of the CRT, thus enlarging the size of one dot in the displayed pattern (hereinafter, to be referred to as "spot size"), thereby reducing the contrast (light and shade, gradation) of the moire pattern.

The above-mentioned conventional measures however have the following disadvantages:

1. There are some cases wherein the moire phenomenon cannot be reduced by changing the size of the display region depending on a particular number of the displayed dots in the horizontal direction.
2. In case of a CRT used in the television receiver, the approximate number of the displayed dots (pixels) are determined previously in accordance with the protocol in the broadcasting system. The dimension of the displayed picture is also determined simply by the size of the CRT. In addition, the CRT for the television receiver can be manufactured by selecting a shadow mask having the aperture pitch that is most suitable to reduce the moire phenomenon because the size of mass-production of such units is very large. In contrast, in the case of a CRT for use in a display monitor, it is impossible to manufacture the CRT having different aperture pitches in accordance with various different ratings specified for the varieties of display monitors, in view of the manufacturing cost, because the production size of such CRT is very small.
3. In the case where a high resolution is required, reducing the moire phenomenon by deteriorating the focusing of the electron beam and enlarging the spot size hence reducing the contrast (light and shade, gradation) of the moire pattern cannot be employed. The requirement for the higher resolution unavoidably contradicts with the poor focusing.
4. In recent years, there has been a growing tendency the requiring the display monitors to have a higher resolution and a greater diversity for coping with the modes of various horizontal synchronization frequencies. Thus, there are frequently cases where a display monitor of so-called multimode scanning type is introduced, whereby one monitor is required to be able to operate under the modes of the various horizontal synchronization frequencies. According to the conventional system, it is impossible for one common display monitor, which can make the moire phenomenon less remarkable and to set the display monitor, while leaving the above-mentioned disadvantages out of practical consideration, in the every such mode by the above-mentioned conventional measures. Therefore, it has been considered to be unavoidable to make a compromise among the respective modes.
5. In recent years, there has also been a tendency requiring the display monitors to be controlled by a microprocessor. This fact means there is a growing tendency requiring that the controls on the display monitors be able to be performed with direct current voltages so as to be readily controlled by the microprocessor.

OBJECT AND SUMMARY OF THE INVENTION

The present invention overcomes the above-mentioned disadvantages of the display monitors of the prior art. The present invention purposes a provision of a display monitor comprising a moire canceling circuit capable of reducing the moire phenomenon for all of modes of operation, particularly for those of the various horizontal synchronization frequencies and, at the same time, providing a setting to suppress the undesirable deterioration in the resolution to a minimum.

According to the present invention, there is provided: a display monitor comprising:
 a horizontal deflection circuit which includes:
 a horizontal synchronization signal processing circuit,
 a horizontal output circuit, and
 a horizontal deflection coil; and
 a moire canceling circuit which includes;
 a frequency divider which divides the horizontal synchronization signal to produce an output signal having a period which is twice the horizontal period; and
 a horizontal position shifting circuit for supplying the horizontal deflection circuit block with a control signal for shifting a display position of a set of scanning lines lengthwise, with respect to another set of scanning lines which are displayed adjacent to the scanning lines of the first mentioned set, for each horizontal period.

In the above-mentioned display monitor, the first mentioned set of scanning lines is shifted to the right while the second mentioned set of the scanning lines is shifted to the left. Further, the first mentioned set of the scanning lines belongs to a certain field while the second mentioned set of the scanning lines belongs to a field which precedes or is subsequent to the first mentioned field.

In the above-mentioned display monitor, the horizontal position shifting circuit receives the output signal from the frequency divider, determines whether the displayed position of the set of the scanning lines should be shifted and supplies the horizontal deflection circuit block with the control signal based on its own determination.

In the above-mentioned display monitor, the horizontal deflection circuit block further comprises an S-correction capacitor connected in series with the horizontal deflection coil and the horizontal position shifting circuit further comprising:

a series circuit of a first resistor and a switching circuit, connected in parallel with the S-correction capacitor, which adds a current to the horizontal deflection current by closing and opening the switching circuit for each horizontal period to shift a displayed position of a set of scanning lines lengthwise with respect to another set of scanning lines, which are displayed adjacent to the scanning lines of the first mentioned set, for each horizontal period, and varies the value of the current to be added to the horizontal deflection current in compliance with the deflection angle of the electron beam whether it is for the central part or peripheral part of the raster display.

In the above-mentioned display monitor, the moire canceling circuit further comprises:

a constant voltage source whose output voltage is adjustable with a control direct current voltage, connected to the horizontal position shifting circuit, for making the amount of the shifting of the displayed position of the scanning lines on the raster adjustable with a direct current voltage.

The moire canceling circuit in the above-mentioned display monitor may further comprise:

a means for supplying an initial value control signal that switches one level to another level for every frame period to the moire canceling circuit in a manner such that the relative shifting direction for the display position of the sets of scanning lines is switched from left to right for every frame period.

In the above-mentioned display monitor, the means for supplying the initial value control signal further comprises:

an initial value setting circuit which receives the vertical synchronization signal and produces an initial value control signal whose logic level is inverted for every frame period.

By providing the above-mentioned means for supplying said horizontal deflection circuit block with a control signal, or the above-mentioned moire canceling circuit, it is now possible for the display monitor to reduce the horizontal moire phenomenon (i) for various modes of operating the display monitor, (ii) for various size of the display region, (iii) for various numbers of the displayed dots aligned in the horizontal direction, and (iv) for any value of the aperture pitch of the shadow mask in the CRT, in a simple structure and at a low manufacturing cost, while suppressing the deterioration in the resolution to a minimum. In the display monitors of the multimode scanning type in particular, a substantial shortening in the period for the development, a substantial reduction in the development cost as well as an improvement in the quality in the displayed image will also be realized.

While the novel features of the present invention are set forth particularly in the appended claims, the invention, both as to organization and content, will be better understood and appreciated, along with other objects and features thereof, from the following detailed description of the present invention taken in conjunction with the drawings.

BRIEF DESCRIPTION OF THE DRAWINGS

FIG. 9B is a set of timing charts showing the waveforms of the signals appeared at the various points in the circuit shown in FIG. 9A;

FIG. 12 is a set of timing charts showing the waveforms of the vertical synchronization signal, the horizontal synchronization signal and the position shifting control signal in a display monitor operating under the non-interlacing system with the odd number of the scanning lines for one frame; and FIG. 13 is a set of timing charts showing the waveforms of the vertical synchronization signal, the horizontal synchronization signal and the position shifting control signal in a display monitor operating under the non-interlacing system with the even number of the scanning lines for one frame.

DESCRIPTION OF THE PREFERRED EMBODIMENTS

Figure 1:
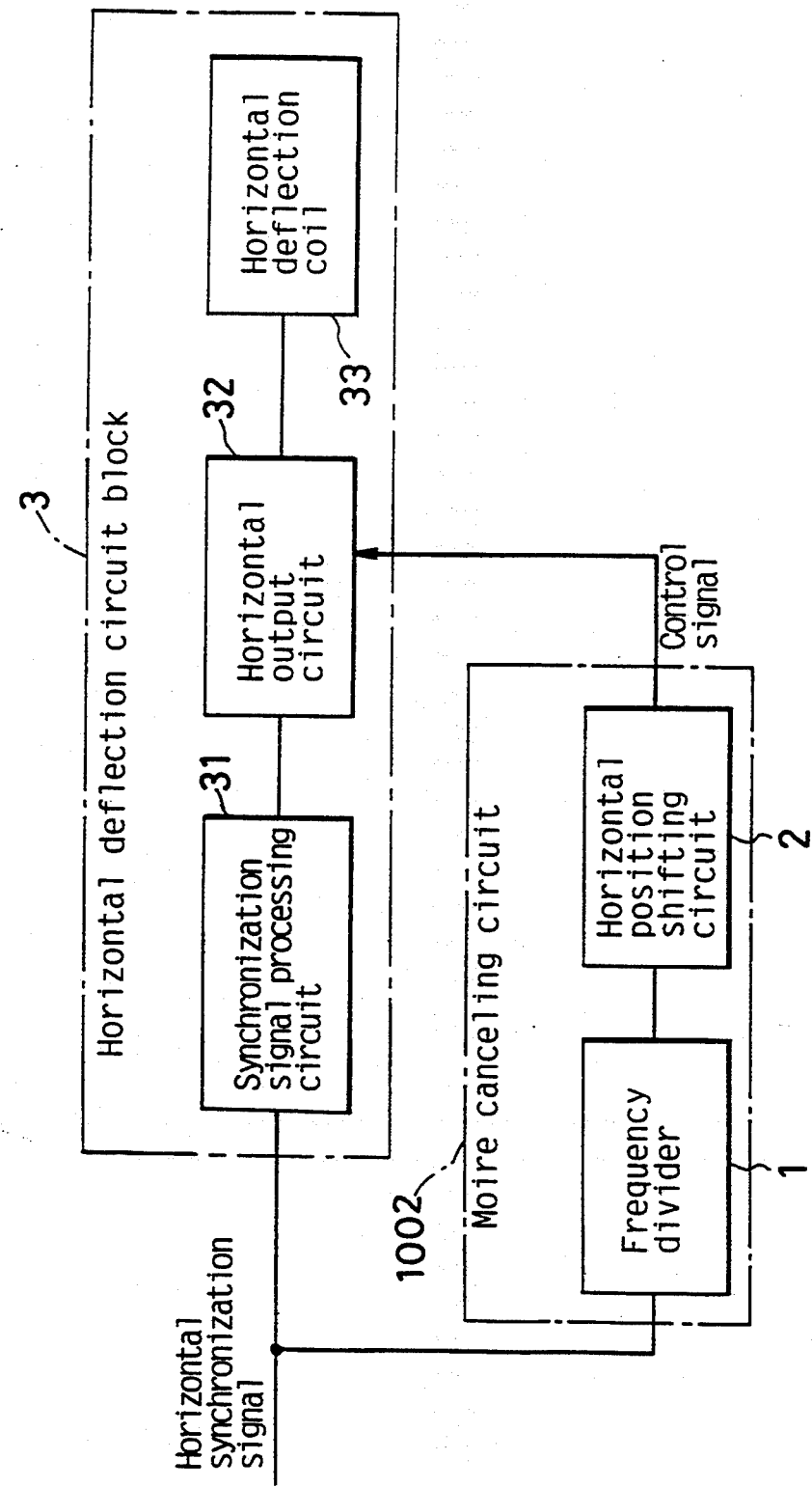
FIG. 1 is a block diagram showing a horizontal moire canceling circuit in accordance with one embodiment of the present invention.

In the following paragraphs, the present invention will be described in more detail with reference to the preferred embodiments illustrated in the attached drawings, wherein similar reference numerals are used to designate the same or similar parts and components through several views.

EXAMPLE 1

Referring now to FIG. 1, there is shown a block diagram of a moire canceling circuit built in accordance with one embodiment of the present invention. The embodiment shown in FIG. 1 comprises; a frequency divider 1; a horizontal position shifting circuit 2; and a horizontal deflection circuit block 3 which includes a horizontal synchronization signal processing circuit 31, a horizontal output circuit 32 and a horizontal deflection coil 33.

Figure 2:
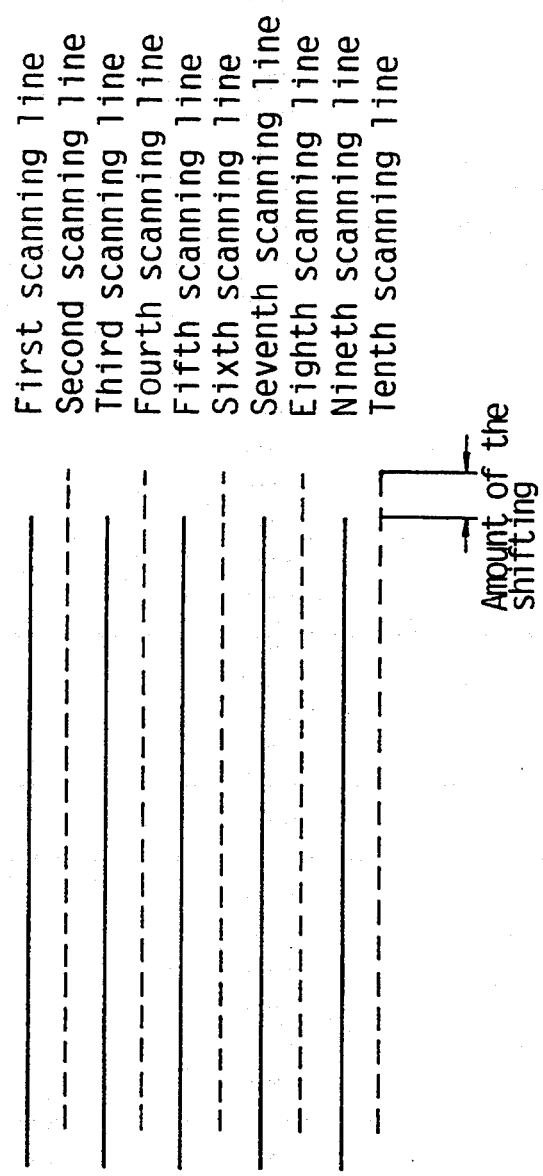
FIG. 2 is a schematic view of the displayed raster produced on the CRT of the display monitor comprising the moire canceling circuit shown in FIG. 1.

FIG. 2 is a schematic view of an example of the displayed raster produced on the CRT of the display monitor comprising the moire canceling circuit 1002 shown in FIG. 1. In the following paragraphs, the relationship between the respective components of the circuit shown in FIG. 1 and their operation will be described with reference to FIG. 2.

The frequency divider 1 receives the horizontal synchronization signal and supplies the horizontal position shifting circuit 2 with an output signal having a period which is twice as great as the horizontal period, i.e., having a frequency which is a half the frequency of the horizontal synchronization signal. The horizontal position shifting circuit 2 receives the output signal from the frequency divider 1, determines whether the displayed position of the scanning lines should be shifted lengthwise and supplies the horizontal deflection circuit block 3 with a control signal that effects to shift the displayed position of the scanning lines for every period which is twice as much as the horizontal period. The horizontal deflection circuit block 3 shifts the displayed positions of the scanning lines lengthwise for every such period which is twice as much as the horizontal period, in response to the control signal from the horizontal position shifting circuit 2. By virtue of this moire canceling circuit 1002, the positions of the scanning lines of odd number odd-numbered scanning lines, e.g., the first and the third scanning lines, are shifted lengthwise leftward with respect to those of the adjacent scanning lines of even number scanning lines, e.g., the second and the fourth scanning lines. The even-numbered scanning lines on the picture are left unmoved, as in a state illustrated by FIG. 2.

The set of the scanning lines to be shifted may be either of those having the odd number or those having the even number. Alternatively, apart from the above-mentioned example, the positions of the sets of the scanning lines may be controlled in a manner that the set of the odd-numbered scanning lines is shifted to the right whereas the set of the even-numbered scanning lines is shifted in the opposite direction, i.e., to the left. That is, both the odd-numbered scanning lines and the even-numbered scanning lines are shifted in each-other opposite direction. In any way, according to the present invention, the displayed positions of the scanning lines on the raster are brought to a state wherein one set is shifted with respect to the other set. Namely, the phase of the displayed raster pattern is made to differ from that of the interference wave of the shadow mask of the CRT, between the first set of the scanning lines having the odd number and the second set of the scanning lines having the even number. Thereby the contrast (light and shadow, gradation) of the horizontal moire phenomenon can be weakened and the horizontal moire phenomenon on the displayed raster can also be reduced. Only a slight amount of the horizontal shifting in the displayed raster, for instance, not greater than that of one dot of the displayed scanning line in the horizontal direction, is sufficient for this purpose. Since the amount of the shifting in the horizontal position of the displayed raster can be set to its optimum value in compliance with the state of the moire phenomenon, it is made possible to readily set the amount to its optimum for the various modes of the display monitor of multi-mode scanning type in particular.

EXAMPLE 2

Figure 3:
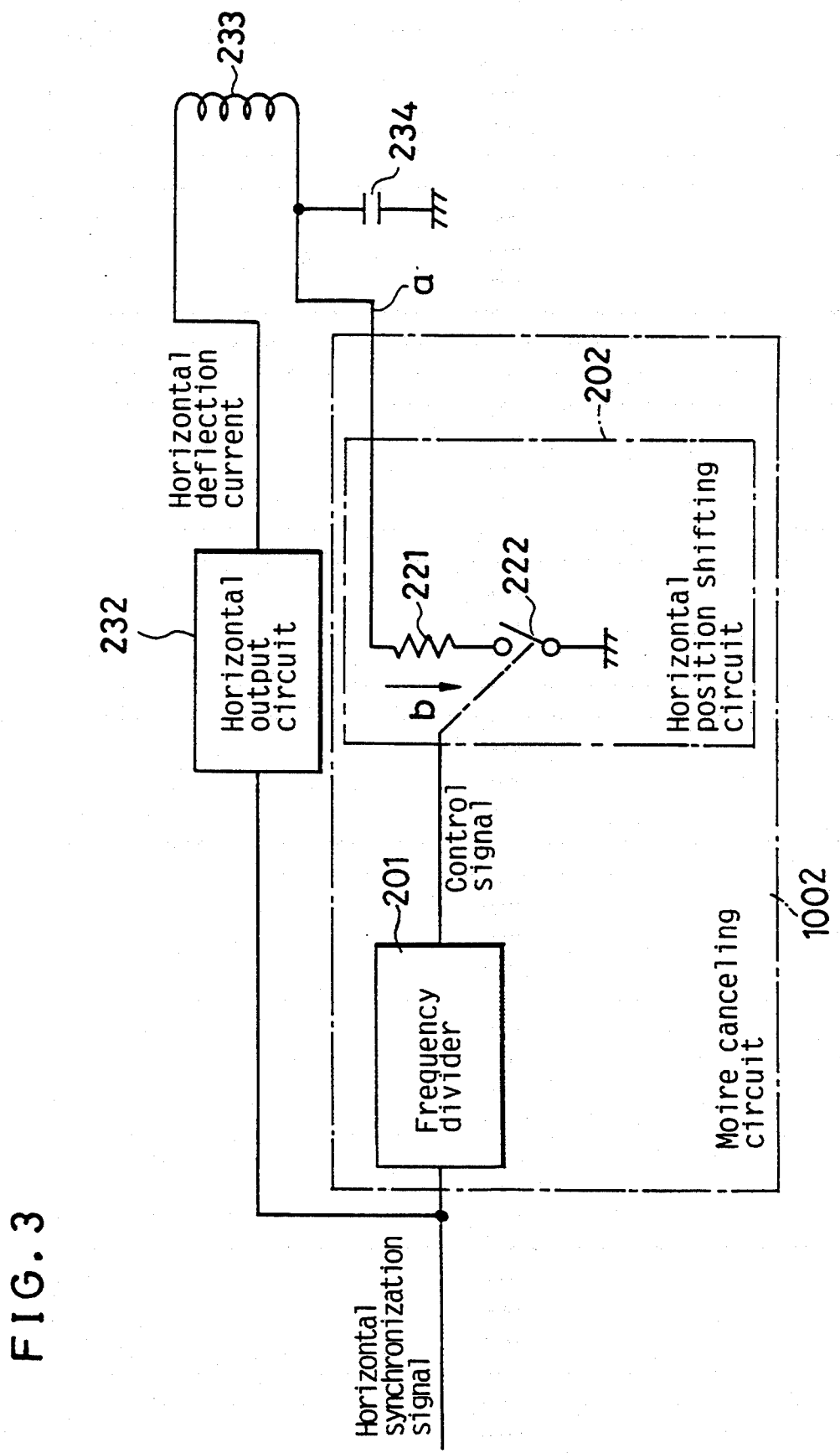
FIG. 3 is a schematic circuit diagram showing another embodiment of the moire canceling circuit which is similar to that shown in FIG. 1.

Referring now to FIG. 3, there is shown a circuit diagram showing the principle of another embodiment of the present invention. In FIG. 3, the illustrated moire canceling circuit 1002 comprises; the frequency divider 201, the horizontal position shifting circuit 202 including a resistor 221 and a switch 222, a horizontal output circuit 232, a horizontal deflection coil 233 and a S-correction capacitor 234.

In the horizontal deflection circuit block 232, a series connection of the horizontal deflection coil 233 and the S-correction capacitor 234 is included. The thus configured circuit of this embodiment comprises a series circuit of a first resister 221 and a switching devise 222, connected in parallel with the S-correction capacitor 234. The series circuit adds a varying current to the horizontal deflection current by closing and opening the switching circuit for each horizontal period. Thus, the series circuit shifts the displayed position of a set of scanning lines lengthwise, with respect to another set of the scanning lines which are displayed adjacent to the scanning lines of the first mentioned set for each horizontal period. The series circuit is also designed so that the value of the current to be added to the horizontal deflection current varies in compliance with the deflection angle of the electron beam whether it is for the central part or peripheral part of the displayed raster.

Figure 4:
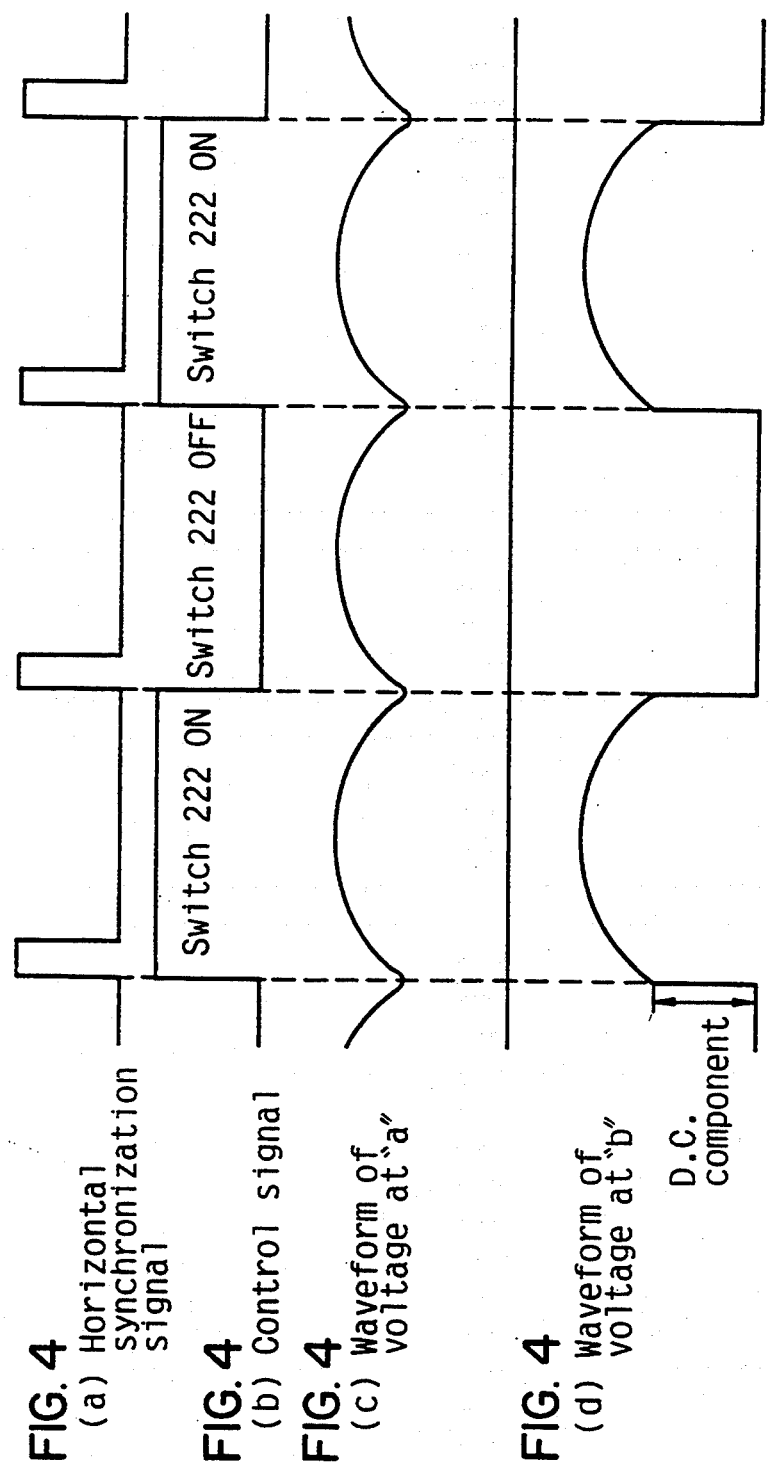
FIG. 4 is a set of timing charts showing various waveforms of the signals appeared at the respective points of the circuit shown in FIG. 3.

FIG. 4 is a set of timing charts showing various waveforms of the signals appearing at the respective points of the circuit shown in FIG. 3. In the following paragraphs, the relationship between the respective components of the circuit shown in FIG. 3 and their operation will be described with reference to FIG. 4.

The frequency divider 201 receives the horizontal synchronization signal (represented by the waveform (a) in FIG. 4) and outputs a control signal (represented by the waveform (b) in FIG. 4) having a period which is twice as long as that of the horizontal period. The horizontal position shifting circuit 202 changes over the state (ON-OFF) of the switch 222 in response to the input control signal. Namely, from the time when the switch 222 is ON, a current is provided through the first resistor 221; whereas when the switch 222 is OFF, no current flows through resistor 221, thus a current represented by (d) in FIG. 4 is added to the horizontal deflection current by ON-OFF of the switch 222. By virtue of this current, the displayed position of the scanning lines in the raster is shifted lengthwise for every period which is twice as much as the horizontal period, whereby the contrast (light and shade, gradation) of the horizontal moire phenomenon is weakened and the horizontal moire phenomenon on the displayed raster can also be reduced.

In general, the face plate for the fluorescent screen of the ordinary CRT is not a sphere, but is manufactured to be approximate to a flat face. Therefore, the amount of the deflection on the screen face with the same deflection current becomes gradually greater as the electron beam departs from its center of the face plate to peripheral portions. Thus, in order to uniformly reduce the moire phenomenon in the displayed raster, it is necessary that the current to be added to the deflection current be controlled such that it is greater at the central portion of the displayed raster and smaller at the peripheral portions.

In this embodiment, when the switch 222 is ON, the resistor 221 is connected in parallel to the S-correction capacitor 234. A voltage of a parabolic waveform represented by (c) in FIG. 4 in the horizontal period is generated across the S-correction capacitor 234, and this parabolic waveform voltage is designed so as to correspond to the curvature of the face plate of the CRT. Therefore, the current to be added to the horizontal deflection current also becomes parabolic, as represented by the waveform (d) in FIG. 4. The intensity of the resultant current which actually flows through the deflection coil 233 therefore becomes greater at the center of the displayed raster and smaller at the peripheral portions. Thus, the moire phenomenon can be uniformly reduced over the entire raster, without requiring a special modulation circuit.

Only a slight amount of the horizontal shifting in the displayed raster, for instance, not greater than one dot of the displayed pattern in the horizontal direction, is sufficient for accomplishing the purpose. The amount of shifting in the horizontal position of the displayed raster can be set to its optimum value in compliance with the state of the moire phenomenon, by adjusting the resistance value of the resistor 221.

Figure 5:
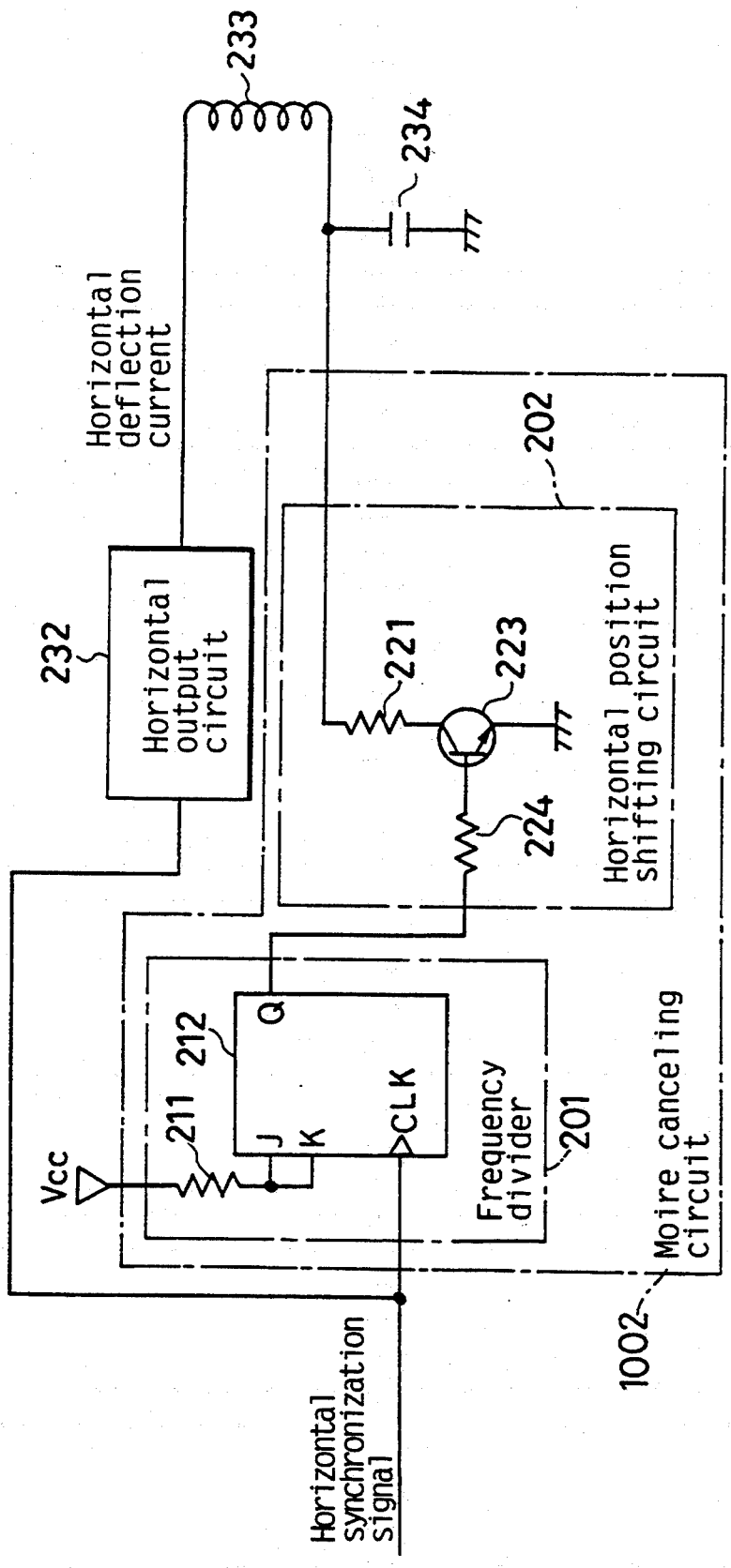
FIG. 5 is a schematic circuit diagram showing a concrete embodiment of the horizontal moire canceling circuit shown in FIG. 3.

Referring now to FIG. 5, there is shown a concrete example of the moire canceling circuit 1002 built in accordance with the principle shown in FIG. 3, wherein a transistor is used as the switch 223. The circuit shown in FIG. 5 comprises; the frequency divider 201, which includes a second resistor 211 and a flip flop circuit 212; the horizontal position shifting circuit 202, which includes the first resistor 221, an NPN transistor 223 and a third resistor 224; the horizontal output circuit 232, horizontal deflection coil 233 and the S-correction capacitor 234. The flip flop circuit 212 may be any flip flop circuit as far as it can inverse the logic level of the output signal on the inputted clock signal (the horizontal synchronization signal).

In the following paragraphs, the relationship between the respective components of the circuit shown in FIG. 5 and their operation will be described with reference to FIG. 4.

The output Q of the flip flop circuit 212 is inverted with respect to the logic level on the clock signal. Since the clock signal is the horizontal synchronization signal (represented by the waveform (a) in FIG. 4), high and low logic levels alternately appear at the output Q of the flip flop circuit 212 for the every horizontal period (as represented by the waveform (b) in FIG. 4). The output Q of the flip flop circuit 212 is supplied to the base of the NPN transistor 223 through the third resistor 224. When the output of the flip flop circuit 212 is in its high logic level, the NPN transistor 223 turns ON, whereby a parabolic current is added to the horizontal deflection current through the first resistor 221 and the NPN transistor 223. When the output of the flip flop circuit 212 is in its low logic level, the NPN transistor 223 turns OFF, and no current is flown through the first resistor 221. Thus a current is added to the horizontal deflection current (as represented by the waveform (d) in FIG. 4). Since the addition of the current to the horizontal deflection current results in the lengthwise shifting of the selected set of the scanning lines in the displayed raster and the selected set is shifted horizontally with respect to the non-selected set, the moire phenomenon on the displayed raster is reduced accordingly. Since the value of the current to be added to the horizontal deflection current is determined by the resistance value of the first resistor 221, it is now possible to decrease the moire phenomenon to substantially non-remarkable level. This can be made in a manner that the moire phenomenon less remarkable for the various numbers of the displayed dots aligned in the horizontal direction, for the various size of the displayed raster and for any value of the aperture pitch of the shadow mask in the CRT, by adjusting the resistance value of the first resistor 221.

In any circuit other than illustrated in FIG. 5, the moire phenomenon can be uniformly reduced over the entire displayed raster by adjusting the value of the current to be added to the horizontal deflection current. The adjusting should be made so as to be greater at the center of the displayed raster but smaller at its peripheral portions. And the positions of the selected set of the scanning lines are shifted with respect to the other set for every such period which is twice as much as that of the horizontal period, by varying the current responding to the positions of the dots on the displayed raster.

EXAMPLE 3

Figure 6:
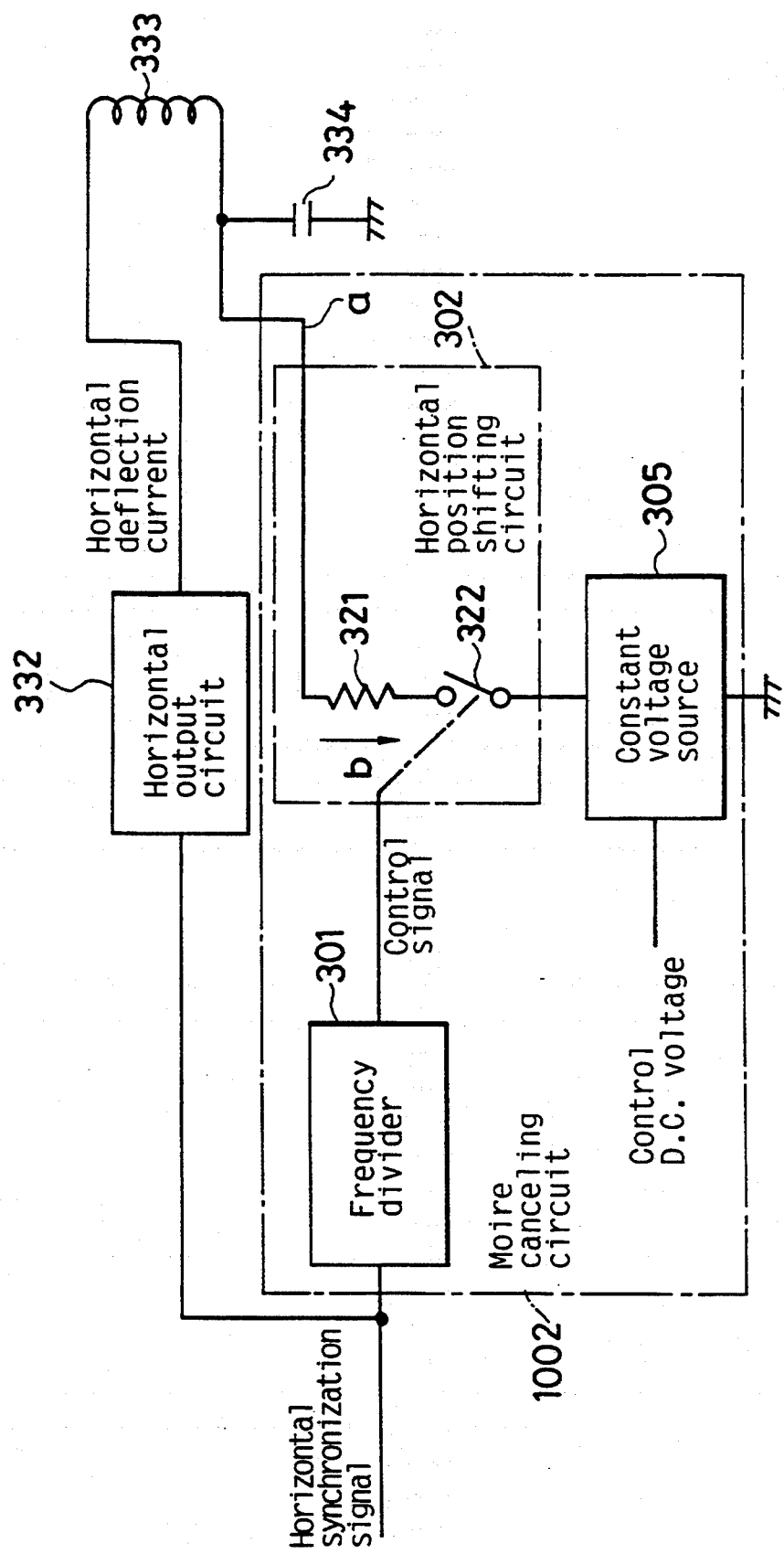
FIG. 6 is a schematic circuit diagram showing another horizontal moire canceling circuit similar to that shown in FIG. 3.

Referring now to FIG. 6, there is shown a circuit diagram illustrating a principle of another embodiment of the present invention. The circuit shown in FIG. 6 comprises; a frequency divider 301; a horizontal position shifting circuit 302, which includes a first resistor 321 and a switch 322; a horizontal deflection coil 333; an S-correction capacitor 334; and a constant voltage source 305, whose output voltage can be adjusted by the control direct current voltage (hereinafter, to be simply referred to as "constant voltage source") connected to the horizontal position shifting circuit 302.

In this circuit of the thus configured embodiment, the value of the current to be added to the horizontal deflection current and thus the amount of the shifting of the displayed scanning lines can be adjusted by varying the output voltage of the constant voltage source 305. The output voltage of the constant voltage source 305 is supplied to the series circuit composed of the first resistor 321 and the switching device 322, connected in parallel with the S-correction capacitor 334. Thereby, the output voltage of the constant voltage source 305 can be adjusted by controlling a control direct current voltage to be supplied to the constant voltage source 305.

In accordance with the circuit shown in FIG. 6, it is made possible to reduce the moire phenomenon over the entire displayed raster, for the various numbers of the displayed dots aligned in the horizontal direction, for the various size of the displayed raster and for any value of the aperture pitch of the shadow mask in the CRT. In addition to this, the circuit of FIG. 6 can perform the adjustment of the shifting amount of the displayed scanning lines by varying the value of a direct current voltage.

In the following paragraphs, the relationship among the respective components of the circuit shown in FIG. 6 and their operation will be described with reference to the timing charts in FIG. 4.

The frequency divider 301 receives the horizontal synchronization signal (represented by the waveform (a) in FIG. 4) and outputs a control signal (represented by the waveform (b) in FIG. 4) having a period which is twice as much as that of the horizontal period. The horizontal position shifting circuit 302 changes the state (ON-OFF) of the switch 322 in response to the inputted control signal. Namely, because when the switch 322 is ON, a current flows through the first resistor 321, whereas when the switch 322 is OFF, no current flows through the resistor 321, a current represented by (d) in FIG. 4 is added to the horizontal deflection current. When the output voltage of the constant voltage source 305 is changed by the control direct current voltage and thus, the voltage across the resistor 321 appeared at the ON state of the switch 322 varies accordingly. The direct current component of the current (represented by (d) in FIG. 4) to be added to the horizontal deflection current also varies. Thereby the shifting amount scanning lines change on the displayed raster. Since the current to be added to the horizontal deflection current becomes parabolic as represented by the waveform (d) in FIG. 4, which is greater at the center of the displayed raster and smaller as the electron beam departs from the center to the peripheral portions, the moire phenomenon is reduced over the entire displayed raster.

Only a slight amount of the lengthwise shifting of the scanning lines, for instance, of that smaller than the space between the dots aligned horizontally over the displayed pattern is sufficient for reducing the moire phenomenon. This amount can be set by adjusting the output voltage of the constant voltage source 305 with the control direct current voltage to its optimum value in compliance with the state of the moire phenomenon to be reduced.

Figure 7:
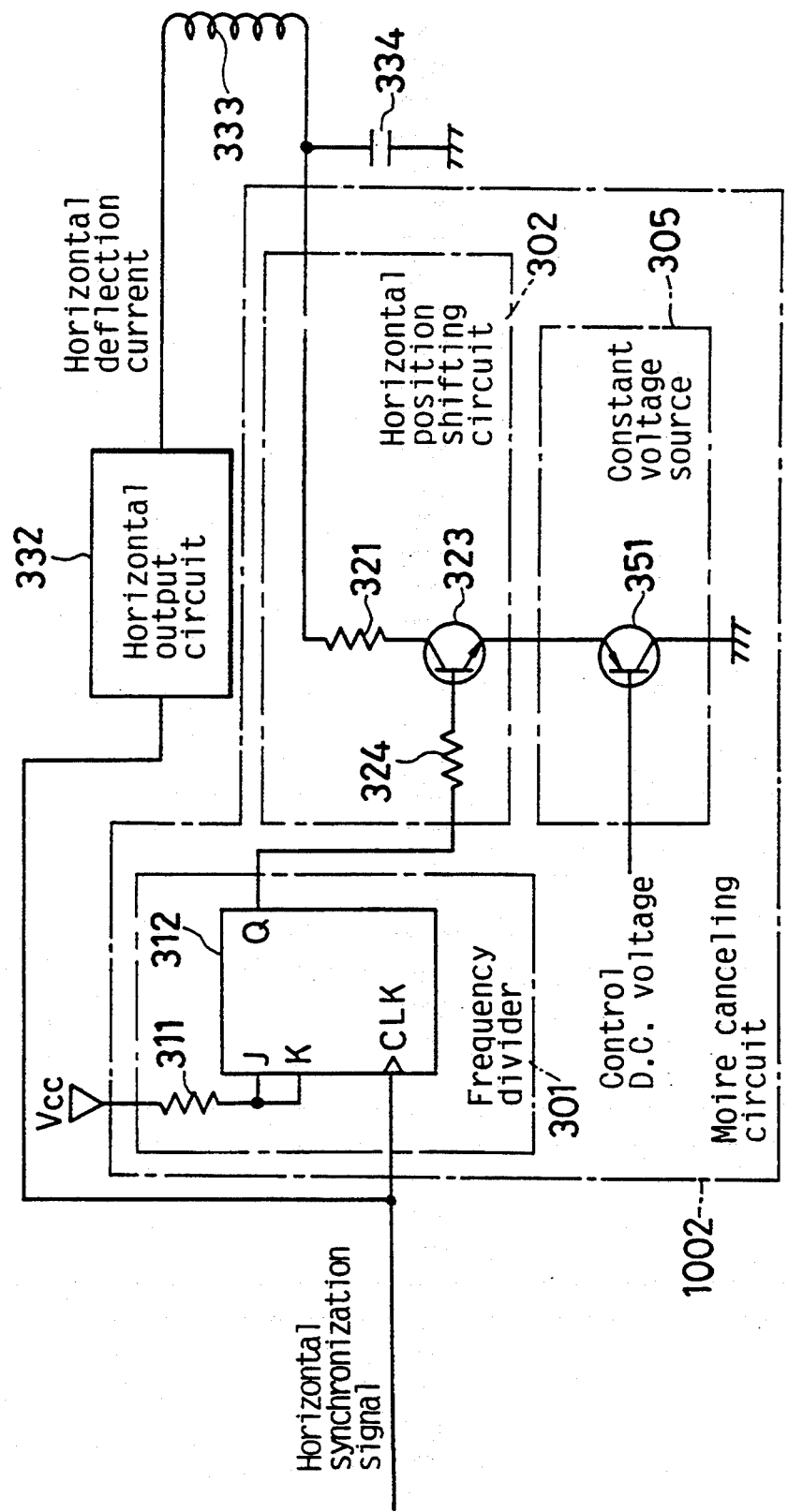
FIG. 7 is a schematic circuit diagram showing an an embodiment of the horizontal moire canceling circuit that shown in FIG. 6.

Referring now to FIG. 7, there is shown a concrete example of the moire canceling circuit built in accordance with the principle shown in FIG. 6, wherein an NPN transistor 351 is used as the main component of the constant voltage source. The circuit shown in FIG. 7 comprises; the frequency divider 301, which includes a second resistor 311 and a flip flop circuit 312; the horizontal position shifting circuit 302, which includes the first resistor 321, an NPN transistor 323 and a third resistor 324; the horizontal output circuit 332; the horizontal deflection coil 333; and the S-correction capacitor 334. The flip flop circuit 312 may be any flip flop circuit as far as it can inverse the logic level of the output signal on the inputted clock signal (the horizontal synchronization signal).

In the following paragraphs, the relationship among the respective components of the circuit shown in FIG. 7 and their operation will be described with reference to the timing charts in FIG. 4.

The output Q of the flip flop circuit 312 is inverted with respect to the logic level of the input clock signal. Since the clock signal is the horizontal synchronization signal (represented by the waveform (a) in FIG. 4), high and low logic levels are alternately appeared at the output Q of the flip flop circuit 312 for the every horizontal period (as represented by the waveform (b) in FIG. 4). The output Q of the flip flop circuit 312 is supplied to the base of the NPN transistor 323 through the third resistor 324. The control direct current voltage is applied to the base of the PNP transistor 351. The value of the control direct current voltage to be applied to the base of the PNP transistor 351 is previously determined to be in a range wherein, when the output Q of the flip flop circuit 12 is in its high logic level, both of the NPN transistor 323 and PNP transistor 351 turn ON. Thus, when the output Q of the flip flop circuit 312 is in its high logic level, both of the NPN transistor 323 and PNP transistor 351 turn ON. Thereby a parabolic current is added to the horizontal deflection current through the first resistor 321 and the NPN transistor 323 and PNP transistor 351. On the contrary, when the output Q of the flip flop circuit 312 is in its low logic level, the NPN transistor 323 turns OFF and no current flows through the first resistor 321. Thus no current is added to the horizontal deflection current (as represented by the waveform (d) in FIG. 4).

The addition of the current to the horizontal deflection current results in the lengthwise shifting of the selected set of the scanning lines in the displayed raster, and the selected set is shifted horizontally with respect to the non-selected set. Thereby, the moire phenomenon on the displayed raster can be reduced accordingly. The value of the current to be added to the horizontal deflection current is determined by the resistance value of the first resistor 321 and the voltage appeared across the first resistor 321 at the time of the output Q of the flip flop circuit 312 is in its high logic level. The voltage across the first resistor 321 at the time of high logic level of the output Q of the flip-flop circuit 312 is determined by the value of the control direct current voltage to be applied to the base of the PNP transistor 351. Therefore, the amount of the shifting of the scanning lines on the displayed raster can be adjusted in a manner that the moire phenomenon is reduced to its minimum, through adjusting of the value of the control direct current voltage to be applied to the base of the PNP transistor 351.

EXAMPLE 4

Figure 8:
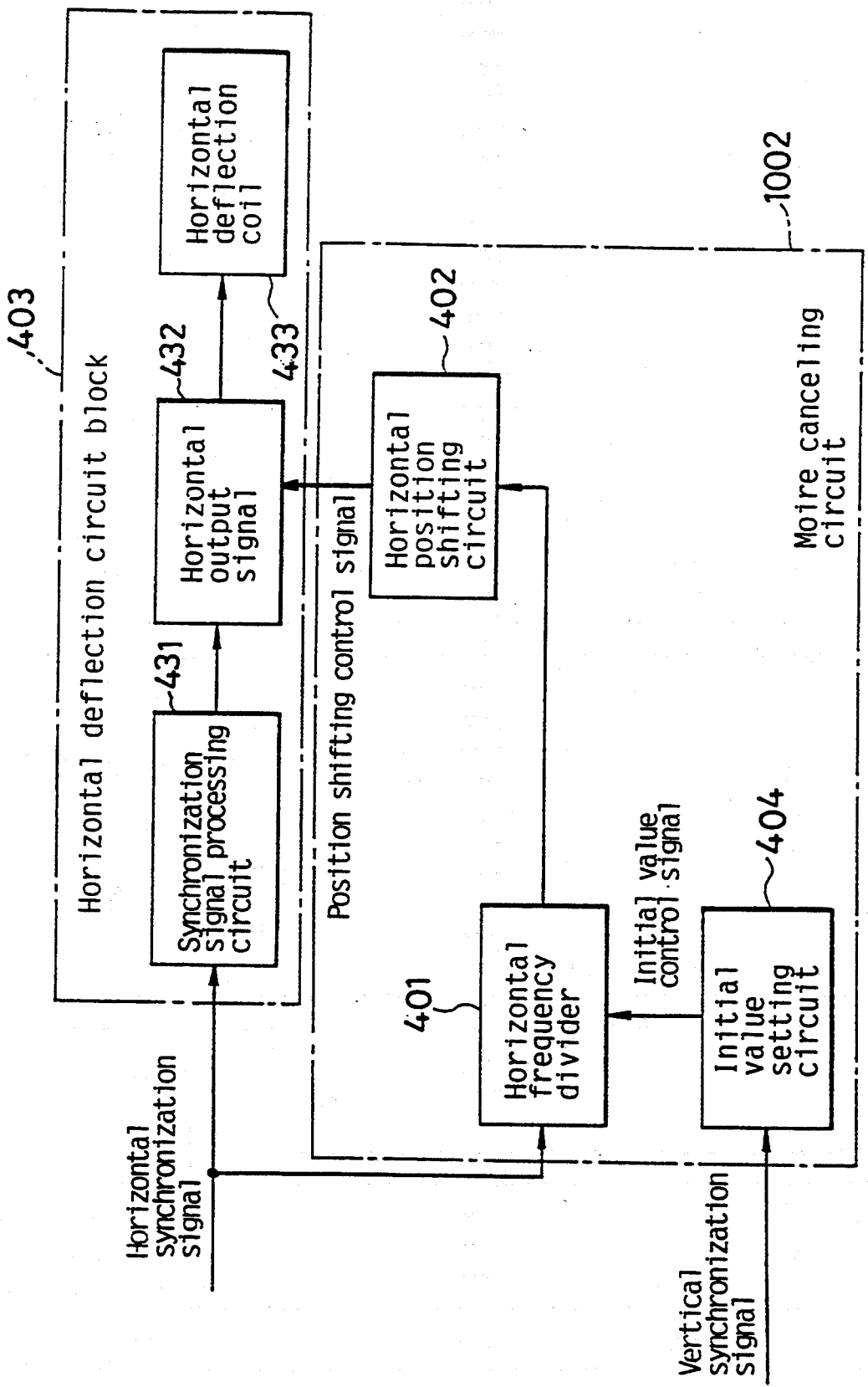
FIG. 8 is a block diagram showing a horizontal moire canceling circuit in accordance with another embodiment of the present invention.

FIG. 8 is a block diagram showing a principle of another embodiment of the moire canceling circuit, whereby the vertical line of the displayed image will not show an undesirable bent in a display monitor operating under the non-interlacing system, thus improving the quality of the displayed picture.

Incidentally, when any of the concepts of the foregoing embodiments is applied to a display monitor operating under the scanning system having an even number of the scanning lines for one frame, there arises another problem in that the vertical line in the image displayed on the screen is undesirably bent in a zig-zag fashion.

In the next few paragraphs, this particular problem inherent to the foregoing embodiments will be briefly described with reference to FIG. 10A, FIG. 10B, FIG. 11A, FIG. 11B, FIG. 12 and FIG. 13.

Figure 10A:
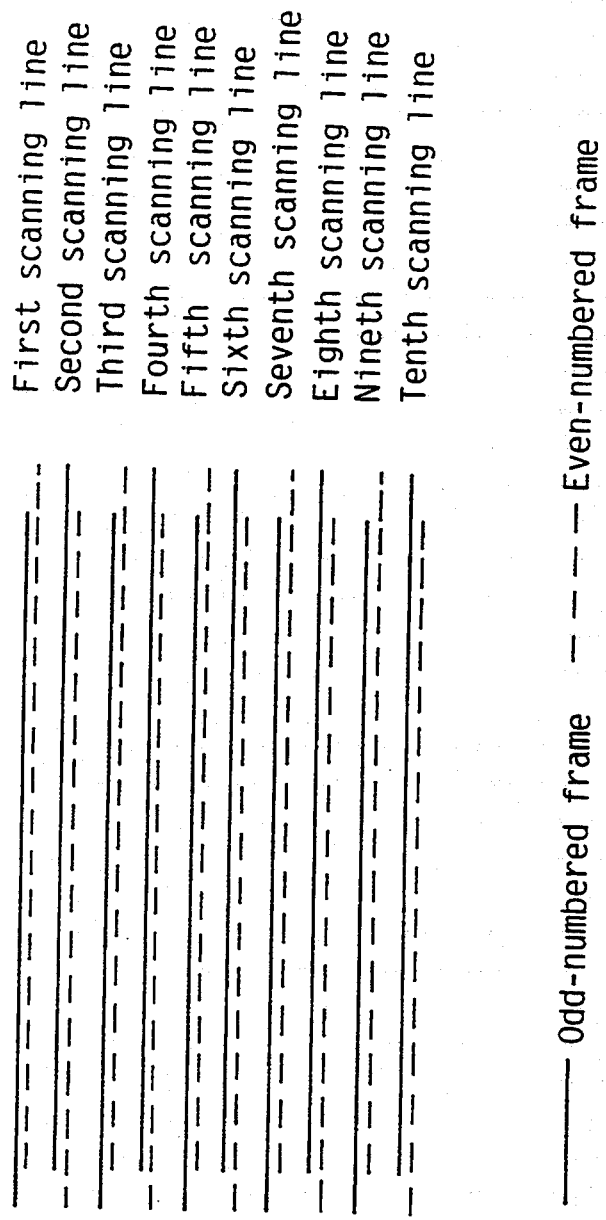
FIG. 10A is a schematic view of the displayed raster produced on the CRT of the display monitor of the non-interlacing system with the odd numbers of the scanning lines for one frame.
Figure 10B:
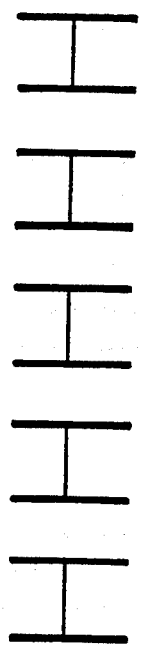
FIG. 10B is a schematic view of a part of the displayed character produced on the CRT of the display monitor of the non-interlacing system with the odd numbers of the scanning lines for one frame.
Figure 11A:
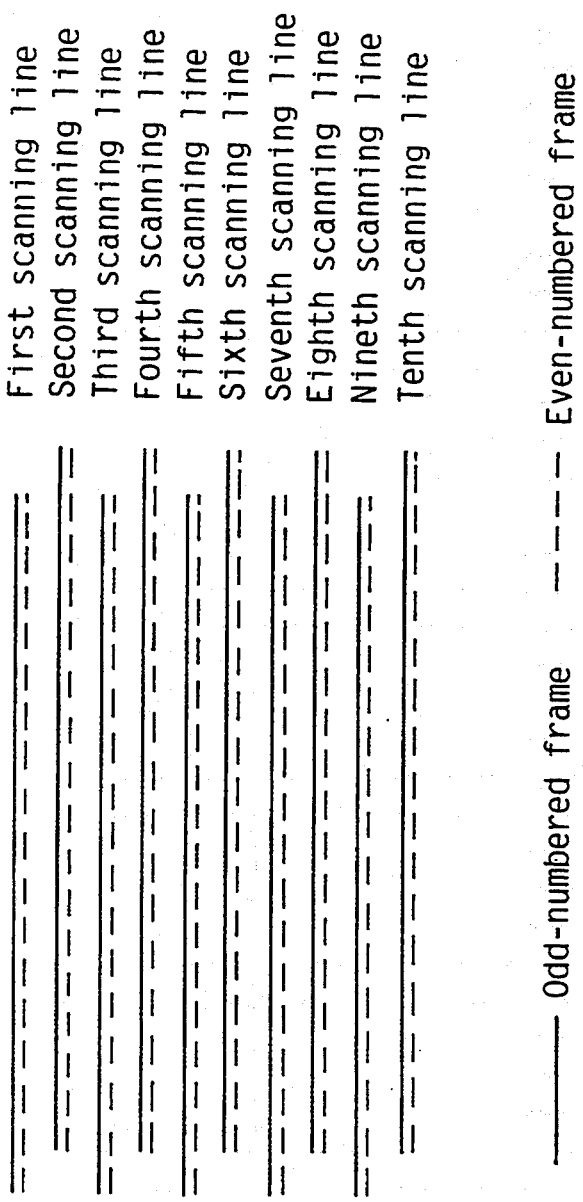
FIG. 11A is a schematic view of the displayed raster produced on the CRT of the display monitor of the non-interlacing system with the even numbers of the scanning lines for one frame.
Figure 11B:
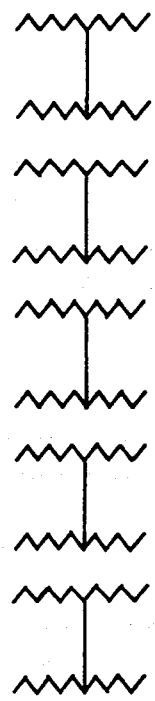
FIG. 11B is a schematic view of a part of the displayed character produced on the CRT of the display monitor of the non-interlacing system with the odd numbers of the scanning lines for one frame.

FIG. 10A is a schematic view of the exemplified displayed raster on the display monitor built in accordance with any of the foregoing embodiments, in the case, wherein the odd numbers of the scanning lines are employed for one frame. FIG. 10B is a schematic view of an example of the character produced in the displayed raster of FIG. 10A. FIG. 11A is a schematic view of the exemplified displayed raster on the display monitor built in accordance with any of the foregoing embodiments, in the case of the even number of the scanning lines for one frame. FIG. 11B is a schematic view of an example of the character produced in the displayed raster of FIG. 11A. FIG. 12 is a set of timing charts of the display monitor built in accordance with any of the foregoing embodiments, in the case of the odd number of the scanning lines for one frame. FIG. 13 is a set of timing charts of the display monitor built in accordance with any of the foregoing embodiments, in the case of the even number of the scanning lines for one frame.

In the case of the foregoing embodiment, wherein the number of the scanning lines for one frame is odd, the position shifting control signal produced by the frequency divider is represented by the bottom waveform in FIG. 12. In the position shifting signal, the logic level of the initial value of the even-numbered frame is inverted with respect to the logic level of the initial value of the odd-numbered frame. The set of the scanning lines to be shifted at the even-numbered frame changes to the set of the scanning lines to be shifted at the odd-numbered frame as shown by FIG. 10A. Therefore, the vertical line on the displayed raster is merely thickened as much as the amount of the shiftings as indicated by FIG. 10B, and there is no serious problem.

On the contrary, in the case of the foregoing embodiment, wherein the number of the scanning lines for one frame is even, the position shifting control signal produced by the frequency divider 1 is represented by the bottom waveform in FIG. 13. In the position shifting signal, since the logic level of the initial value in the even-numbered frame coincides with the logic level of the initial value in the odd-numbered frame, the set of the scanning lines to be shifted at the even-numbered frame coincides with the set of the scanning lines to be shifted at the odd-numbered frame as shown by FIG. 11A. As a result, the vertical line on the displayed raster is bent in a zig-zag fashion as much as the amount of the shiftings as indicated by FIG. 11B, and the quality of the displayed raster is deteriorated. In the case of the display monitor operating under the interlacing system, there is no such problem because the numbers of the scanning lines for one frame are always odd. On the contrary, in the case of the display monitor operating under the non-interlacing system, the above phenomenon may sometimes be produced because the display monitor operating under the non-interlacing system includes the both cases of odd-numbered and even-numbered scanning lines for one frame.

This moire canceling circuit is designed for reducing a horizontal moire phenomenon induced by a mutual interference between the dots in the displayed image signal pattern and the aperture in the shadow mask of the CRT. This is made by shifting the displayed position of the scanning lines lengthwise with respect to the scanning lines displayed adjacent to the first mentioned scanning lines. In practice, the shifting is made by inputting a position shifting control signal to the horizontal deflection circuit block. The circuit of FIG. 8 is devised in order to solve the above-mentioned problem. The circuit comprises a means for supplying an initial value control signal that switches from one logic level to the other logic level for every frame period to the moire canceling circuit in a manner such that the relative shifting direction for the display position is switched from left to right for every frame period.

By being configured as described above, the circuit shown by FIG. 8 produces no undesirable phenomenon of bending the vertical line of the displayed image in a zig-zag fashion without regard to the number of the scanning lines for one frame period, and thereby improves the quality of the displayed raster without regard to the driving system of the display monitor.

The circuit shown by FIG. 8 comprises; a horizontal frequency divider 401; horizontal position shifting circuit 402; a horizontal deflection circuit block 403 which includes, a synchronization signal processing circuit 431, a horizontal deflection output circuit 432 and a horizontal deflection coil 433; and an initial value setting circuit 404.

The operation of the moire canceling circuit shown by FIG. 8 will be described by referring to FIG. 10A, FIG. 10B, FIG. 11A, FIG. 11B, FIG. 12 and FIG. 13 in the following paragraphs.

The initial value setting circuit 404 receives the vertical synchronization signal and supplies the horizontal frequency divider 401 with an initial value control signal which corresponds to the frame period. The horizontal frequency divider 401 receives the horizontal synchronization signal and the initial value control signal, and supplies the horizontal position shifting circuit 402 with a position shifting signal whose initial value is inverted for every frame period. The horizontal position shifting circuit 402 and the horizontal deflection circuit block 403 determine whether the displayed position on the raster should be shifted lengthwise based on the input position shifting control signal, and shift the displayed position on the raster lengthwise for every period which is twice as long as that of the horizontal period. As a result, a state is brought, wherein the displayed position on the raster is shifted lengthwise for every horizontal period, whereby the phase of the interference wave between the displayed image pattern and the shadow mask of the CRT changes for every horizontal period and the contrast (light and shadow, gradation) of the moire phenomenon on the displayed raster is reduced accordingly.

As stated above, the initial value of the above-mentioned position shifting control signal is inverted for the frame period by the above-mentioned initial value control signal. Thus, a state which is equal to the case wherein the numbers of the scanning lines for one frame period are odd in the foregoing embodiment is always brought without regard to the numbers of the scanning lines for one frame period. In other words, by virtue of the provision of the initial value setting circuit 404, the timing of the position shifting control signal becomes as represented by the bottom waveform in FIG. 12 and the set of the scanning lines to be shifted is changed one to the other at the odd-numbered frame and the even-numbered frame as shown by FIG. 10A, as contrasted to the case of the bottom waveform in FIG. 13. Therefore, the vertical lines in the displayed image are merely thickened as much as the amount of the lengthwise shifting as shown by FIG. 10B and no undesirable bending of the vertical line as shown in FIG. 11B is produced without regard to the numbers of the scanning lines for one frame period, thereby improving the quality of the displayed raster.

Figure 9A:
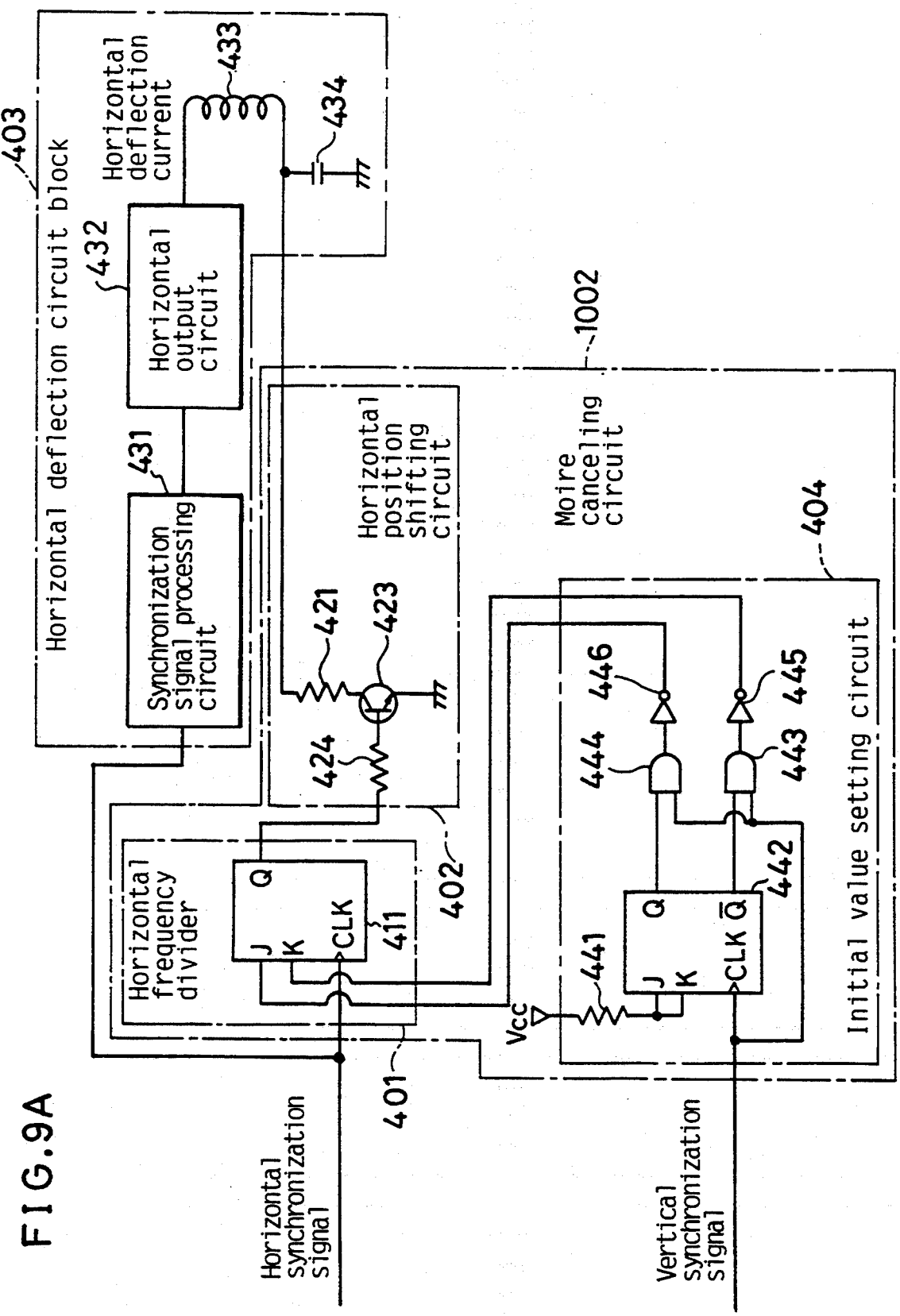
FIG. 9A is a schematic circuit diagram showing a more detailed embodiment of the horizontal moire canceling circuit shown in FIG. 8.

Referring now to FIG. 9A, there is shown a concrete embodiment of the circuit shown in FIG. 8. The circuit of FIG. 9A represents a case of the moire canceling circuit for the display monitor operating under the non-interlacing system. In the circuit of FIG. 9A, the horizontal frequency divider 401 includes a JK flip flop circuit (hereinafter, to be simply referred to as "JKFF") 411. The horizontal position shifting circuit 402 includes a first resistor 421, a third resistor 424 and an NPN transistor 423. The horizontal deflection circuit block 403 includes a synchronization signal processing circuit 431, a horizontal output circuit 432, a horizontal deflection coil 433 and an S-correction capacitor 434. The initial value setting circuit (frame frequency divider) 404 includes a second resistor 441, another JKFF 442, a first AND gate 443, a second AND gate 444, a first inverter 445 and a second inverter 446.

FIG. 9B shows a set of the timing charts, each representing the logic levels in the signals appeared at each of the points of the circuit of FIG. 9A. In FIG. 9B, an assumption is made that when the initial value of the position shifting control signal is high for the even-numbered frame and is low for the odd-numbered frame, though, the assumption may occasionally be inverted depending on the initial value of the JKFF 442.

In the following paragraphs, the relationship among the respective components in the circuit of FIG. 9A and their operation will now be described in detail with reference to FIG. 9B.

The logic levels of the output Q and the output $\overline{Q}$ of the JKFF 442 are inverted from one to the other in compliance with the clock signal. Since the clock signal for the JKFF 442 is the vertical synchronization signal as shown by FIG. 9B, the output Q and the output $\overline{Q}$ of the JKFF 442 are alternating between the high and low levels while taking the mutually inverted logics as shown by FIG. 9B. The AND gate 444 outputs a logic product of the vertical synchronization signal and the output $\overline{Q}$ of the JKFF 442. The logic product outputted from the AND gate 444 is inverted by the inverter 446 to produce an initial value control signal A as shown by FIG. 9B and the initial value control signal A is inputted to a J-terminal of the JKFF 411. The AND gate 443 outputs a logic product of the vertical synchronization signal and the output Q of the JKFF 442. On the other hand, the logic product outputted from the AND gate 443 is inverted by the inverter 445 to produce an initial value control signal B as shown by FIG. 9B and the initial value control signal B is inputted to a K-terminal of the JKFF 411. In the case of the even-numbered frame, the initial value of the position shift control signal (the output Q of the JKFF 411) is in its high level, because the J-terminal of the JKFF 411 is low while the K-terminal is high. On the other hand, in the case of the odd-numbered frame, the initial value of the position shifting control signal (the output Q of the JKFF 411) is in its low level, because the J-terminal of the JKFF 411 is high while its K-terminal is low. From the time when the vertical synchronization signal is in its low logic level, the J-terminal of the JKFF 411 is high and the K-terminal is high, the logic level of the above-mentioned position shifting control signal (the output Q of the JKFF 411) is inverted by the clock signal. Since the clock signal for the JKFF 411 is the horizontal synchronization signal as shown by FIG. 9B, the above-mentioned position shifting control signal (the output Q of the JKFF 411) is issued in its high and low logic levels in alternating fashion for the every horizontal period as shown by FIG. 9B.

Since the pulse duration of the vertical synchronization signal is constant for both the even-numbered frame and the odd-numbered frame, the logic level (high and low) of the above-mentioned position shifting control signal corresponding to the respective scanning lines changes for the respective even-numbered and the odd-numbered frames.

The position shifting control signal (the output Q of the JKFF 411) is supplied to the base of the NPN transistor 423 through the third resistor 424. When the logic level of the position shifting control signal (the output Q of the JKFF 411) is high, the NPN transistor 423 is ON, and a current corresponding to the voltage across the first resistor 421 is added to the horizontal deflection current through the first resistor 421 and the NPN transistor 423. When the logic level of the position shifting control signal (the output Q of the JKFF 411) is low, the NPN transistor 423 is OFF, and no current is added to the horizontal deflection current, because any current is flown through the first resistor 421.

Since the displayed position of the scanning lines in the raster is horizontally shifted by the addition of the current to the horizontal deflection current, the displayed position in the raster shifts lengthwise for every such inversion of the logic level of the above-mentioned position shifting control signal. Since the phase of the vertical synchronization signal is within the blanking period of the video image signal in general, the displayed position of the selected scanning lines is shifted lengthwise with respect to that of the adjacent scanning lines for the every horizontal period in the range of the displayed video image, whereby the moire phenomenon on the displayed raster is reduced. Since the value of the current to be added to the horizontal deflection current is determined by the resistance value of the first resistor 421, it is possible to set the display monitor so as to make the moire phenomenon less remarkable for various mode of operation of the display monitor by adjusting the resistance value of the first resistor 421. Furthermore, by combining the display monitor of this embodiment with those shown by FIG. 6 and FIG. 7. it is also possible to control the display monitor for the reduction of the moire phenomenon by adjusting the direct current voltage to be applied to the constant voltage source.

Although the present invention has been described in its preferred form with a certain degree of particularity, it is understood that the present disclosure of the preferred form has been changed in the details of construction and the combination and arrangement of parts and components may be resorted to without going out from the spirit and the scope of the invention as hereinafter claimed.

What is claimed is:

1. A display monitor comprising:
   a) a horizontal deflection circuit which includes:
      i) a horizontal synchronization signal processing circuit,
      ii) a horizontal output circuit, and
      iii) a horizontal deflection coil; and
   b) a moire canceling circuit which includes;
      i) a frequency divider which divides the horizontal synchronization signal to produce an output signal having a period which is twice as much as the horizontal period; and
      ii. a horizontal position shifting circuit for periodically supplying the horizontal deflection circuit with an additional current for the horizontal deflection coil in response to the output signal, the additional current having a parabolic waveform for shifting a display position of a set of scanning lines lengthwise with respect to another set of scanning lines which are displayed adjacent to the scanning lines of the first mentioned set for each of the horizontal periods.

2. The display monitor according to claim 1, wherein said first mentioned set of the scanning lines is shifted to the right while the second mentioned set of the scanning lines is shifted to the left.

3. The display monitor according to claim 1 or 2, wherein the first mentioned set of scanning lines belongs to a first field while the another set of scanning lines belongs to a field which is preceding or subsequent to the first field.

4. The display monitor according to claim 1, wherein the horizontal position shifting circuit receives the output signal from the frequency divider, determines whether the displayed position of the set of the scanning lines should be shifted and supplies the horizontal deflection circuit block with the control signal based on the determination.

5. The display monitor according to claim 1, wherein the horizontal defection circuit further comprises an S-correction capacitor connected in series with the horizontal deflection coil and the horizontal position shifting circuit further comprises a series circuit of a first resistor and a switching circuit, connected in parallel with the S-correction capacitor, which adds a current to the horizontal deflection current by closing and opening the switching circuit for each of the horizontal periods to shift a displayed position of the set of scanning lines lengthwise with respect to the another set of scanning lines which are displayed adjacent to the set scanning lines for each of the horizontal periods, and varies the value of the current to be added to the horizontal deflection current in compliance with the deflection angle of the electron beam based on whether the electron beam is aimed at a central part or a peripheral part of a raster display.

6. The display monitor according to claim 5, wherein the moire canceling circuit further comprises: a constant voltage source whose output voltage is adjustable with a control direct current voltage connected to the horizontal position shifting circuit, for making the amount of the shifting of the displayed position of the scanning lines on the raster adjustable with the direct current voltage.

7. The display monitor according to claim 1, wherein the moire canceling circuit further comprises: a means for supplying an initial value control signal that switches from one level to another level for every frame period to the sets of scanning lines is switched from left to right for every frame period.

8. The display monitor according to claim 7, wherein the means for supplying the initial value control signal further comprises: an initial value setting circuit which receives the vertical synchronization signal and produces an initial value control signal whose logic level is inverted for every frame period.

* * * * *

UNITED STATES PATENT AND TRADEMARK OFFICE
CERTIFICATE OF CORRECTION

PATENT NO.   : 5,440,353

DATED        : August 8, 1995

INVENTOR(S)  : YAMAZAKI et al.

It is certified that error appears in the above-identified patent and that said Letters Patent is hereby corrected as shown below:

Column 8, lines 8-10, please delete:

"Thus a current is added to the horizontal deflection current (as represented by the waveform (d) in FIG. 4)."

and replace it with the following:

--Thus no current is added to the horizontal deflection current (as represented by the waveform (d) in FIG. 4).--

Signed and Sealed this

Thirtieth Day of July, 1996

Attest:

BRUCE LEHMAN

*Attesting Officer*            *Commissioner of Patents and Trademarks*